May 24, 1960   R. S. BRIMHALL   2,937,622
HYDRAULIC DUAL ACTING BRAKING CYLINDER UNIT
Filed Nov. 22, 1957   2 Sheets-Sheet 1

INVENTOR.
RAY S. BRIMHALL
BY
Andrus, Scealu & Starke
ATTORNEYS

May 24, 1960   R. S. BRIMHALL   2,937,622
HYDRAULIC DUAL ACTING BRAKING CYLINDER UNIT
Filed Nov. 22, 1957   2 Sheets-Sheet 2

INVENTOR.
RAY S. BRIMHALL
BY
*Andrus, Sceales & Starke*
ATTORNEYS

United States Patent Office 2,937,622
Patented May 24, 1960

2,937,622

HYDRAULIC DUAL ACTING BRAKING CYLINDER UNIT

Ray S. Brimhall, 1820 S. Industrial Road, Salt Lake City, Utah

Filed Nov. 22, 1957, Ser. No. 698,178

4 Claims. (Cl. 121—38)

This invention relates to hydraulic braking systems and more particularly to an improving actuating cylinder therefor. The invention finds particular utility when used in large truck and tractive vehicles.

Brake systems of this type must obviously be made as safe and foolproof as possible, and dual or auxiliary power supply systems are well-known wherein a second system can be brought into operation in the event of failure of the primary braking system. Many of the present day systems, however, have become very complicated to operate, repair and maintain and have a high initial cost.

In accordance with the present invention, a dual brake system of the hydraulic type is provided which is simple in construction and operation, easy to service and maintain and highly efficient in performing its intended functions.

The invention contemplates a single actuating cylinder for each brake unit, said cylinder having two independently actuated pistons, one for the primary brake system and the other for the auxiliary brake system.

This invention provides a simple and efficient dual braking system.

These and other objects and advantages will appear more fully hereinafter as this disclosure progresses, reference being had to the accomanying drawings in which.

Referring in greater detail to the drawings, each set of wheels 5 of a vehicle (not shown) may have a braking cylinder unit 6 connected to its slack adjusting arm 7. Actuation of the arm 7 causes the brake bands (not shown) to expand or contract in the well-known manner.

Figure 3:
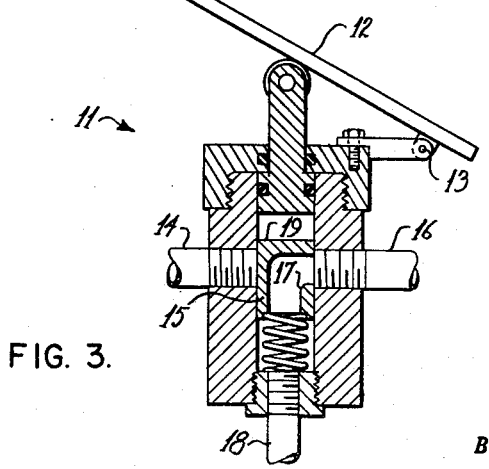
Figure 3 is a cross-sectional view of the foot pedal valve, shown in Figure 1, for the primary brake system.

The hydraulic system includes an engine driven hydraulic pump 8 which receives fluid from reservoir 9 via conduit 10. A valve 11 is located in the cab (not shown) of the vehicle and is shown here for illustrative purposes as being operated by actuation of the foot pedal 12 pivoted at 13. Fluid pressure is supplied from the pump via line 14 to the valve and when the valve is in the released position as shown in Figure 3, the spool 15 blocks entry of pressure fluid into the valve. Under this condition fluid is free to return to the valve 11 from the cylinders via line 16, through passage 17 in the spool and then to the reservoir via conduit 18.

When the pedal 12 is depressed for braking action, the passage 19 in spool 15 places conduit 14 in fluid communication with conduit 16 and pressure fluid is available to all the cylinder units.

Figure 1:
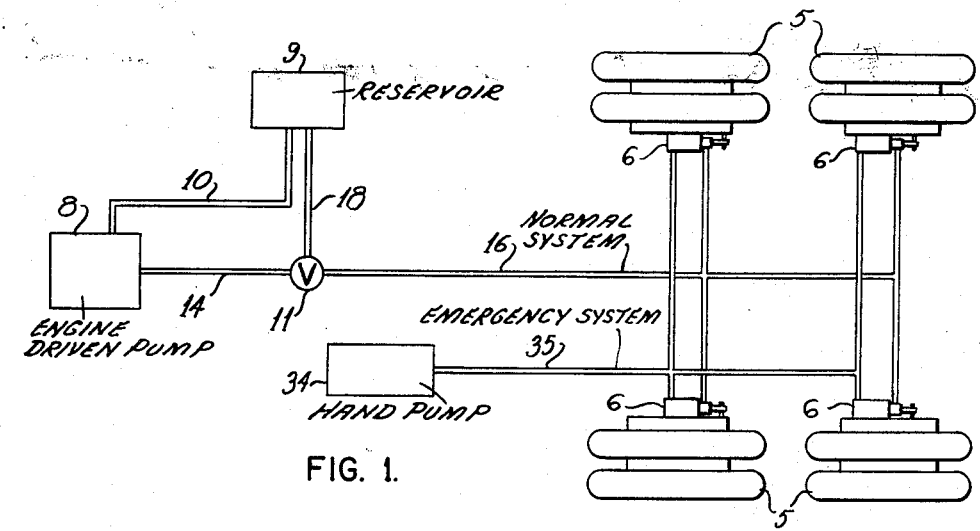
Figure 1 is a schematic diagram of a braking system embodying the invention.
Figure 2:
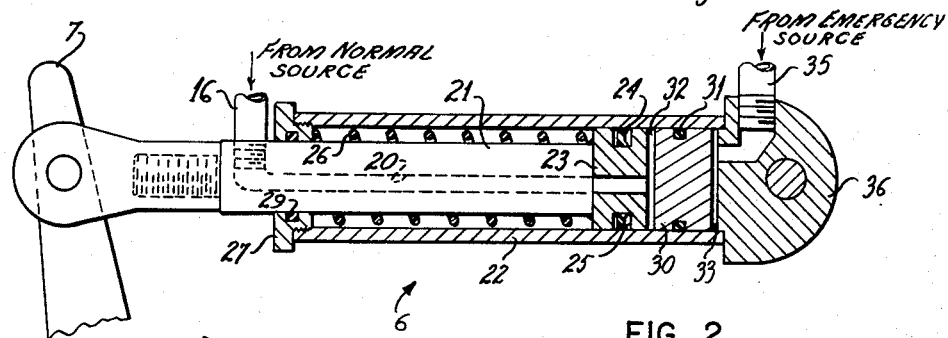
Figure 2 is an axial cross-sectional view, on an enlarged scale, of one of the braking cylinders shown in Figure 1.

Referring to Figure 2, this pressure fluid enters the axial bore 20 in the piston rod 21 and is conducted into the cylinder 22. A first piston 23 is suitably secured on the inner end of the piston rod and has a conventional seal 24 in its peripheral groove 25. A spring 26 bears against the end cap 27 of the cylinder unit and also against the piston 23 to urge the latter to the brake releasing position, or to the right as viewed in Figure 2. The end cap 27 has a shaft seal 29 which forms a sliding seal fit with the rod 21 which reciprocates therethrough.

A free piston 30 is also reciprocable within cylinder 22 and it also has a seal 31 sealingly engaging the inner wall of the cylinder. Thus a first pressure chamber 32 is formed between the pistons and a second pressure chamber 33 is formed between the free piston and the head end of the cylinder.

When fluid is admitted within the cylinder via conduit 16, piston 30 is urged to the extreme right-hand end of the cylinder and piston 23 and its associated rod move to the left or braking position. This is the normal operation of the braking system, in other words, the engine driven pump 8 and valve 11 comprise the primary fluid supply system.

Figure 4:
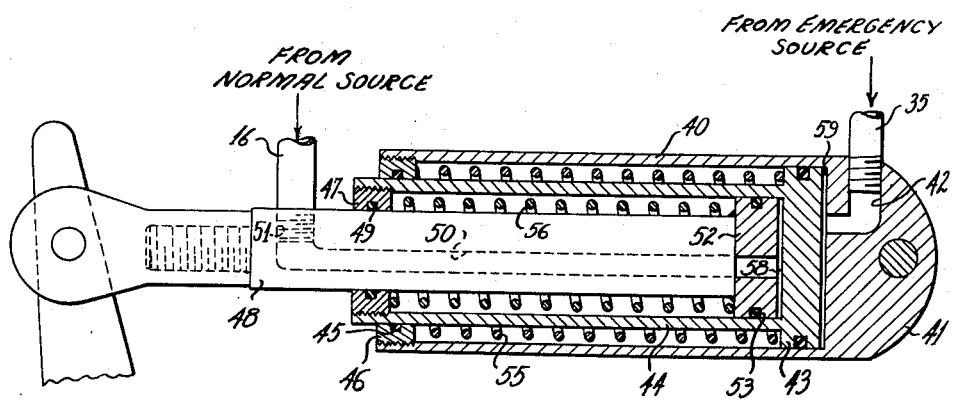
Figure 4 is generally a view similar to Figure 2 but showing a modified form of the invention.

The modification shown in Figure 4 comprises a cylinder 40 having a head portion 41 containing an inlet 42 for the auxiliary brake conduit 35. The free piston 43 in this embodiment has a tubular or cylinder portion 44 which sealingly slides through the O-ring seal 45 in the cylinder end 46. An end 47 threaded in the end of cylinder portion 44 sealingly receives the sliding piston rod 48 in its O-ring 49. Piston rod 48 has passage 50 extending therethrough to the threaded end 51 of which is connected the service or primary braking system conduit 16. The piston 52 is secured to the other end of rod 48 and has the conventional O-ring 53 around its periphery which seals against the inner surface of cylinder portion 44. A spring 55 urges piston 43 into the cylinder 40 and spring 56 urges piston 52 and its rod 48 into the cylinder portion 44.

The operation of the Figure 4 device is similar to that of the device shown in Figure 2. A first pressure chamber 58 is formed between the pistons and a second pressure chamber 59 is formed between the cylinder head 41 and the piston 43.

With either modification, in the event of failure of either the pump 8, valve 11, reservoir 9 or conduits 10, 14 or 16, a second or auxiliary pressure fluid supply system is brought into operation.

Means for supplying the auxiliary pressure takes the form of a conventional hand pump 34 which may be conveniently located next to the vehicle driver.

This auxiliary fluid pressure means is in communication with the head end of the cylinder via conduit 35 threadably engaged in the cylinder head.

When fluid pressure is admitted to the head end of the cylinder via conduit 35, both pistons of each modification are urged to the left or braking positions. Any fluid between the pistons would simply be dumped to the reservoir or out the broken connection in the primary system.

Two independent sources of fluid pressure are available to each cylinder and are each operative in the event of failure of either. The dual piston cylinder is simple in construction, economical to manufacture and efficient in operation.

Various modes of carrying out the invention are contemplated as being within the scope of the following claims particularly pointing out and distinctly claiming the subject matter which is regarded as the invention.

I claim:

1. A fluid motor for actuating a movable member, comprising a first cylinder having a head enclosing one end thereof and annular internal sealing means adjacent the opposite end thereof, a second cylinder slidably disposed within the first cylinder and extending through said sealing means, said second cylinder having a head enclosing the end thereof adjacent the first cylinder head and having an annular internal retaining member adjacent the opposite end thereof, a piston slidably disposed within the second cylinder and having a rod extending therefrom through the retaining member for engagement with the movable member, a primary source of pressure fluid, means for introducing the primary pressure fluid between the piston and second cylinder head to actuate the piston and rod and thereby effect movement of the movable member, a secondary source of pressure fluid independent of said primary source of pressure fluid, means for introducing the secondary pressure fluid between the first cylinder head and the second cylinder head to actuate the second cylinder head and thereby effect movement of the piston and rod together with the movable member in the event of failure of the primary pressure fluid, and means to effect return of the piston and second cylinder head.

2. The invention set forth in claim 1 wherein the means to effect return of the piston and second cylinder head comprises a spring disposed between the piston and the annular retaining member provided on said second cylinder.

3. A fluid motor for actuating a movable member, comprising a first cylinder having a head enclosing one end thereof and an annular internal retaining member adjacent the opposite end thereof, a second cylinder disposed within and spaced from the first cylinder and extending slidably through said retaining member, said second cylinder having a head enclosing the end thereof adjacent the first cylinder head and said head being enlarged to form a shoulder externally of said second cylinder and adapted for sliding engagement within the first cylinder, said second cylinder further having an annular internal retaining member adjacent the opposite end thereof, a piston slidably disposed within the second cylinder and having a rod extending therefrom through the retaining member for engagement with the movable member, a primary source of pressure fluid, means for introducing the primary pressure fluid between the piston and second cylinder head to actuate the piston and rod and thereby effect movement of the movable member, a secondary source of pressure fluid independent of said primary source of pressure fluid, means for introducing the secondary pressure fluid between the first cylinder head and the second cylinder head to actuate the second cylinder head and thereby effect movement of the piston and rod together with the movable member in the event of failure of the primary pressure fluid, a first spring member disposed between the annular retaining member on said first cylinder and the shoulder on said second cylinder head to effect return of the second cylinder, and a second spring member disposed between the annular retaining member on said second cylinder and said piston to effect return of the piston and assist the first spring member in the return of the second cylinder.

4. The invention set forth in claim 3 wherein the means for introducing the primary pressure fluid between the piston and second cylinder head comprises a passageway extending through said rod and piston and the means for introducing the secondary pressure fluid between the first cylinder head and the second cylinder head comprises a passageway through said first cylinder head.

References Cited in the file of this patent
UNITED STATES PATENTS

| | | |
|---|---|---|
| 2,497,438 | Butler | Feb. 14, 1950 |
| 2,628,476 | Grier | Feb. 17, 1953 |
| 2,649,169 | Holman | Aug. 18, 1953 |
| 2,661,599 | Folmer | Dec. 8, 1953 |

FOREIGN PATENTS

| | | |
|---|---|---|
| 999,277 | France | Oct. 3, 1951 |